(12) United States Patent
Hasegawa et al.

(10) Patent No.: US 12,175,760 B2
(45) Date of Patent: Dec. 24, 2024

(54) IMAGE ANALYSIS SYSTEM, IMAGE ANALYSIS METHOD, AND IMAGE ANALYSIS PROGRAM

(71) Applicant: HITACHI KOKUSAI ELECTRIC INC., Tokyo (JP)

(72) Inventors: Keigo Hasegawa, Tokyo (JP); Wataru Ito, Tokyo (JP); Kazunari Iwanaga, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 45 days.

(21) Appl. No.: 17/909,458

(22) PCT Filed: Mar. 11, 2021

(86) PCT No.: PCT/JP2021/009791
§ 371 (c)(1),
(2) Date: Sep. 6, 2022

(87) PCT Pub. No.: WO2021/193101
PCT Pub. Date: Sep. 30, 2021

(65) Prior Publication Data
US 2023/0125890 A1    Apr. 27, 2023

(30) Foreign Application Priority Data
Mar. 27, 2020  (JP) ................................ 2020-057507

(51) Int. Cl.
*G06V 20/52* (2022.01)
*G06T 7/00* (2017.01)
*G06T 7/11* (2017.01)

(52) U.S. Cl.
CPC ............ *G06V 20/52* (2022.01); *G06T 7/0002* (2013.01); *G06T 7/11* (2017.01); *G06T 2207/20081* (2013.01); *G06V 2201/07* (2022.01)

(58) Field of Classification Search
CPC ......... G06T 11/206; G06T 2207/30024; G06T 7/0012; G06T 2207/10016;
(Continued)

(56) References Cited

U.S. PATENT DOCUMENTS

2007/0028219 A1* 2/2007 Miller ................ G05B 23/0275
717/124
2012/0237081 A1* 9/2012 Datta ..................... G06V 20/54
382/103

FOREIGN PATENT DOCUMENTS

JP  2010-171705 A  8/2010
JP  2011-61651 A   3/2011
(Continued)

OTHER PUBLICATIONS

International Search Report dated Jun. 1, 2021.

*Primary Examiner* — Masum Billah
(74) *Attorney, Agent, or Firm* — BACON&THOMAS, PLLC

(57) ABSTRACT

There is provided an image analysis system having an image analysis server which analyzes an input image of a monitoring area and detects a state of a specific monitored object. The image analysis server is configured to divide, in the input image of the monitoring area, a portion of an area in which the monitored object is expected to be present into a plurality of grids, generate a trained model trained by associating "1" with an image of a grid in which the monitored object is present and "0" with an image of a grid in which the monitored object is not present for each grid, calculate, for the input image, a confidence of a presence of
(Continued)

CONFIGURATION OF PRESENT IMAGE ANALYSIS SYSTEM the monitored object for each grid using the trained model, determine a presence or absence of the monitored object in the monitoring area based on confidences of the plurality of grids, and detect an abnormality when a confidence value in at least one of the grids is inconsistent with the determination result.

11 Claims, 7 Drawing Sheets

(58) Field of Classification Search
CPC . G06T 2207/10068; G06T 2207/10081; G06T 2207/20076; G06T 2207/20081
USPC ......................................................... 348/143
See application file for complete search history.

(56) References Cited

FOREIGN PATENT DOCUMENTS

| | | | |
|---|---|---|---|
| JP | 2018-72938 A | | 5/2018 |
| JP | 2018072938 A | * | 5/2018 |
| JP | 2019-139618 A | | 8/2019 |

* cited by examiner

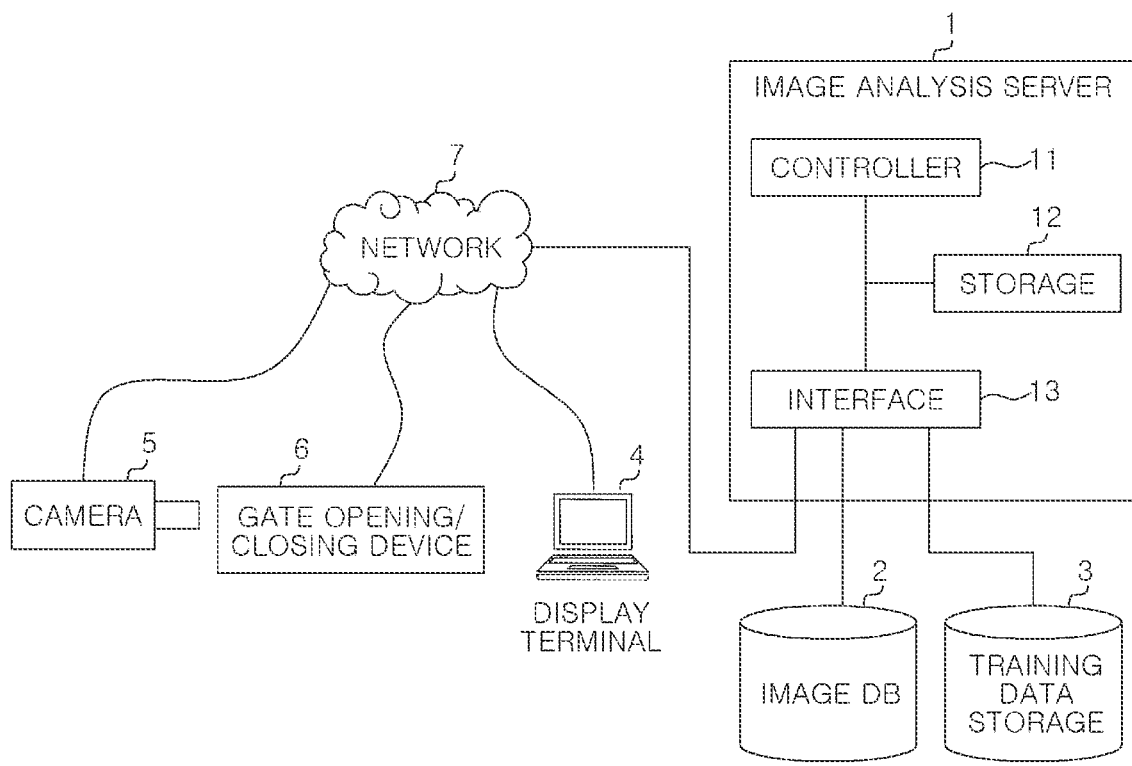
[FIG. 1] CONFIGURATION OF PRESENT IMAGE ANALYSIS SYSTEM

[FIG. 2] OUTLINE OF IMAGE ANALYSIS METHOD IN PRESENT SYSTEM

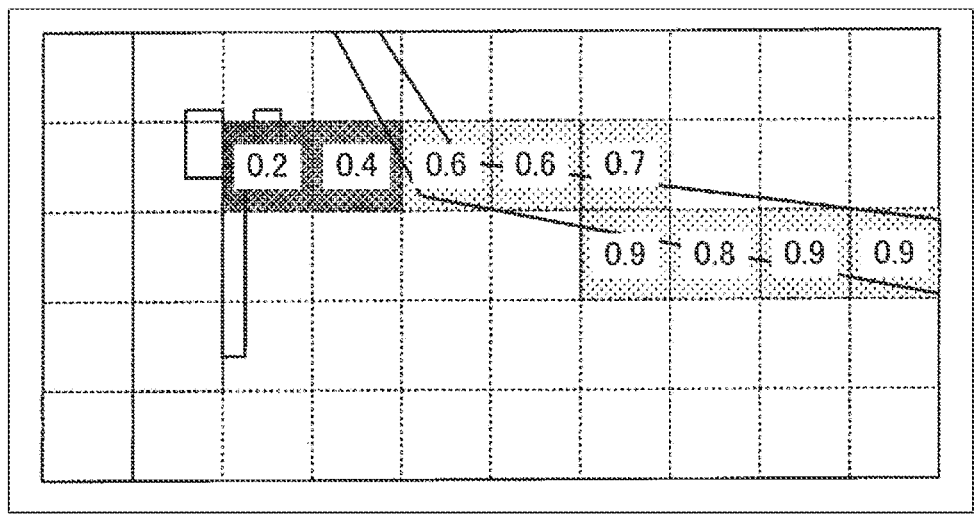
[FIG. 3] EXAMPLE OF ABNORMALITY DETECTION

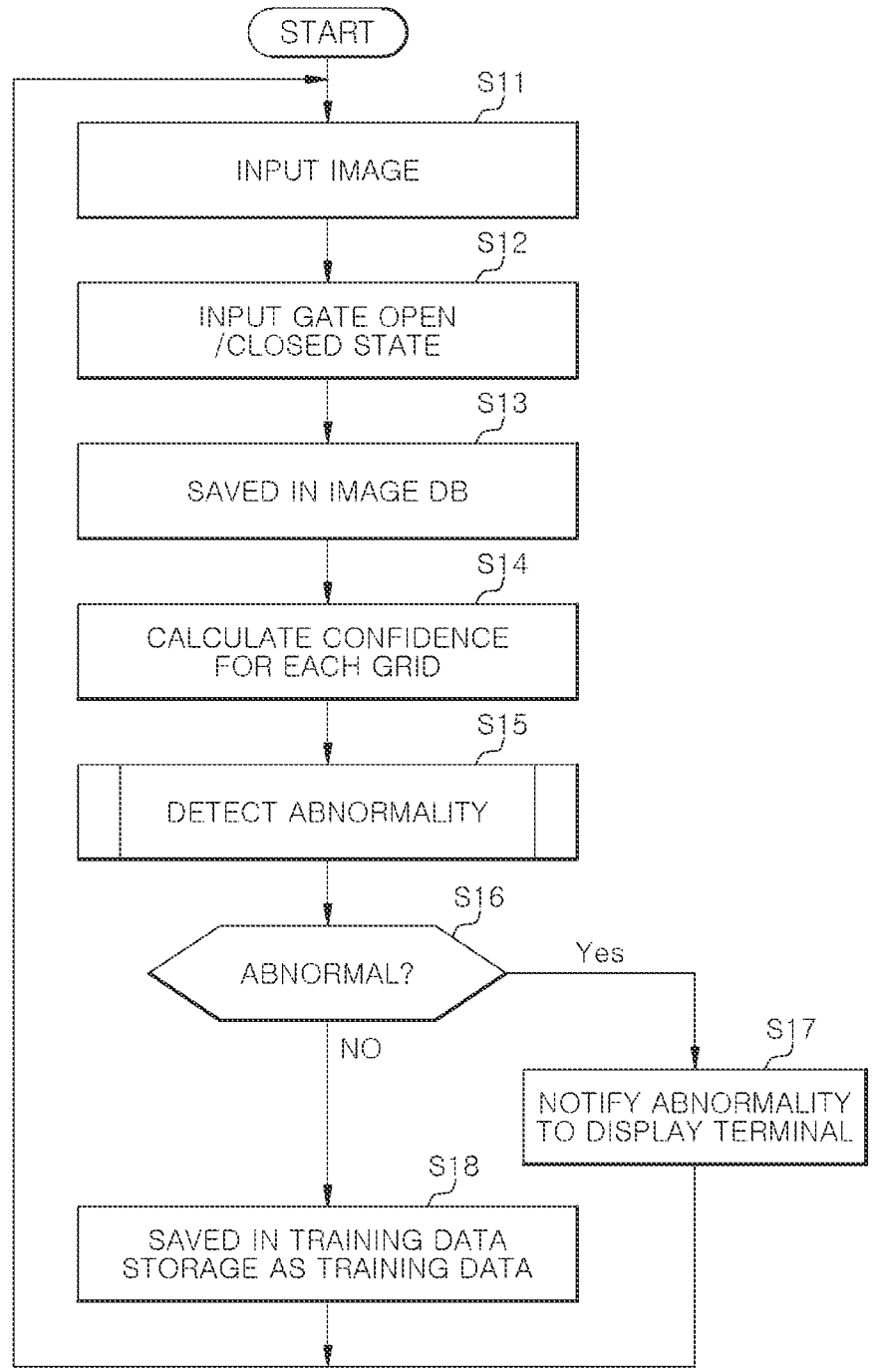
[FIG. 4] PROCESSING OF IMAGE ANALYSIS SERVER

| ID | IMAGE FILE | STATE | TIME |
|---|---|---|---|
| 1 | a.jpg | OPEN | yyyymmdd-hhmmss |
| 2 | b.jpg | CLOSED | yyyymmdd-hhmmss |
| 3 | c.jpg | CLOSED | yyyymmdd-hhmmss |
| 4 | d.jpg | CLOSED | yyyymmdd-hhmmss |
| ⋮ | ⋮ | ⋮ | ⋮ |

[FIG. 5] EXAMPLE OF IMAGE DATA

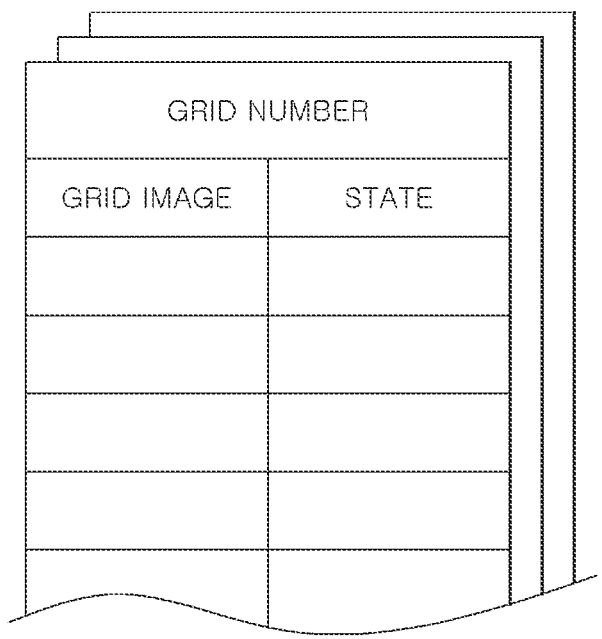
[FIG. 6] EXAMPLE OF TRAINING DATA

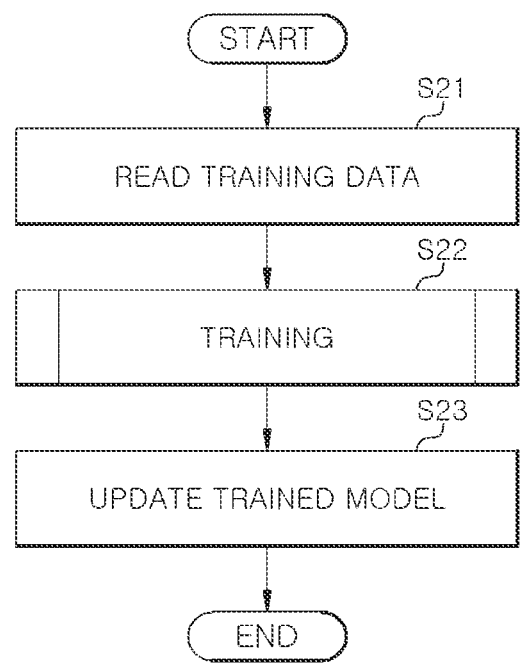
[FIG. 7] OUTLINE OF RETRAINING PROCESSING

IMAGE ANALYSIS SYSTEM, IMAGE ANALYSIS METHOD, AND IMAGE ANALYSIS PROGRAM

TECHNICAL FIELD

The present disclosure relates to an image analysis system, and particularly, to an image analysis system, an image analysis method, and an image analysis program that make it possible to monitor a state of a specific object and quickly detect and report an abnormality without increasing the amount of processing.

BACKGROUND

Description of Related Art

Conventionally, there is an image analysis system that detects a suspicious object or detects an abnormal state (unsteady state) by using captured image information.

In these systems, for example, a pattern matching method is used to detect the suspicious object or an unsteady state (Patent Documents 1 and 2).

In pattern matching, the reference image in a monitoring range is compared with the image captured by an imaging device, and the difference is calculated for each pixel. When the difference is large, it is detected that there is the suspicious object in the area, or it is detected that it is in an unsteady state.

In addition, an object detection (YOLO: You Only Look Once) method may be used. In object detection, using a model trained by deep learning, the shape of the object is detected by surrounding the area of the monitored object in a rectangle, and the change in the shape is detected.

Related Art

In addition, as conventional art for an image analysis system, there are Japanese Patent Laid-Open Publication No. 2011-61651 entitled "Suspicious Object Detection System" (Patent Document 1) and Japanese Patent Laid-Open Publication No. 2010-171705 entitled "Device and Program for Searching Monitored Video Image" (Patent Document 2).

Patent Document 1 discloses that a suspicious object is detected by comparing a captured image captured by a two-dimensional image apparatus with a reference image having lightness closest to the lightness of the captured image.

Patent Document 2 discloses that pattern matching is performed by comparing the latest monitored image data with the past monitored image data, the amount of movement of pixels is calculated, and a moving body is detected.

PRIOR ART DOCUMENTS

Patent Documents

Patent Document 1: Japanese Patent Laid-Open Publication No. 2011-61651
Patent Document 2: Japanese Patent Laid-Open Publication No. 2010-171705

SUMMARY

Problems to be Resolved by the Invention

However, when the state of the object is monitored using a conventional image analysis system, the system using pattern matching is easily affected by changes in sunshine and time. In addition, there is an issue that the amount of processing increases when pattern matching of the entire screen is performed.

In addition, the conventional image analysis system using object detection has an issue that the amount of processing increases and it is complicated to collect teaching data and train a model.

Further, Patent Document 1 and Patent Document 2 do not disclose that an image in an area where a monitored object is expected to be present is divided into a plurality of grids, a trained model which trains, for each grid, an image in which an object is present and an image in which an object is not present is created, and the presence of an object is determined based on the trained model for an input image.

The present disclosure has been made in view of the above-mentioned actual conditions, and is directed to providing an image analysis system, an image analysis method, and an image analysis program that make it possible to correctly detect the state of an object with a small amount of processing, and to improve detection accuracy by continuing training using the obtained image data and the state of the object as teaching data.

Means for Solving the Problem

The present disclosure is directed to addressing an issue associated with the related art, and to providing an image analysis system having an image analysis server which analyzes an input image of a monitoring area and detects a state of a specific monitored object, wherein the image analysis server divides, in an image of the monitoring area, a portion of an area in which the monitored object is expected to be present into a plurality of grids, creates a trained model obtained by training, for each of the grids, an image in which the monitored object is present and an image in which the monitored object is not present, and determines whether the monitored object is present within the grids based on the trained model for the input image.

Further, an embodiment of the present disclosure is characterized in that in the image analysis system, the image analysis server is provided, for each grid, with the trained model trained by associating "1" with an image in which a monitored object is present and "0" with an image in which the monitored object is not present in the grid, and the image analysis server calculates, for an input image, a confidence of a presence of the monitored object for each grid using the trained model.

Further, an embodiment of the present disclosure is characterized in that in the image analysis system, the image analysis server determines a presence or absence of the monitored object in the monitoring area based on confidences of the plurality of grids, and detects an abnormality when a confidence value in any of the grids is inconsistent with information on the presence or absence.

Further, an embodiment of the present disclosure is characterized in that in the image analysis system, the image analysis server obtains information indicating a presence or absence of the monitored object in the monitoring area from the outside, and detects an abnormality when a confidence value in any of the grids is inconsistent with the information indicating the presence or absence.

Further, an embodiment of the present disclosure is characterized in that in the image analysis system, the image analysis server accumulates a set of a grid unit image and information on the presence/absence of the monitored object corresponding to the grid unit image as training data, performs training using the training data to build a new model, and updates the trained model with the new model.

Further, an embodiment of the present disclosure is characterized in that in the image analysis system, the image analysis server excludes an image in which an abnormality is detected and information on the presence or absence of the monitored object corresponding to the image in which the abnormality is detected from the training data.

Further, an embodiment of the present disclosure is directed to an image analysis method for detecting a state of a specific monitored object by analyzing an input image of a monitoring area, the image analysis method including dividing, in the image of the monitoring area, a portion of an area in which the monitored object is expected to be present into a plurality of grids, creating a trained model obtained by training, for each of the grids, an image in which the monitored object is present and an image in which the monitored object is not present, and determining whether the monitored object is present within the grids based on the trained model for the input image.

Further, an embodiment of the present disclosure is directed to an image analysis program which operates on an image analysis server which analyzes an input image of a monitoring area and detects a state of a specific monitored object, wherein the image analysis program causes the image analysis server to perform dividing, in the image of the monitoring area, a portion of an area in which the monitored object is expected to be present into a plurality of grids, generating, for each grid, a trained model trained by associating "1" with an image in which the monitored object is present and "0" with an image in which the monitored object is not present in the grid, calculating, for the input image, a confidence of a presence of the monitored object for each grid using the trained model, obtaining information indicating a presence or absence of the monitored object in the monitoring area from an outside, and detecting an abnormality when a confidence value in at least one of the grids is inconsistent with the information of the presence or absence.

Effect of the Invention

An embodiment of the present disclosure is directed to an image analysis system having an image analysis server which analyzes an input image of a monitoring area and detects a state of a specific monitored object, wherein the image analysis server divides, in an image of the monitoring area, a portion of an area in which the monitored object is expected to be present into a plurality of grids, creates a trained model obtained by training, for each of the grids, an image in which the monitored object is present and an image in which the monitored object is not present, and determines whether the monitored object is present within the grids based on the trained model for the input image. Accordingly, determination can be made by analyzing only a specific area set in advance instead of the entire image, and the amount of processing can be significantly reduced. In addition, an administrator of the monitored object is able to quickly recognize and respond to an abnormality based on the determination result.

Further, an embodiment of the present disclosure is directed to the image analysis system, wherein the image analysis server is provided, for each grid, with the trained model trained by associating "1" with an image in which a monitored object is present and "0" with an image in which the monitored object is not present in the grid, and the image analysis server calculates, for an input image, a confidence of a presence of the monitored object for each grid using the trained model. Accordingly, the detection accuracy can be improved by processing using the trained model.

Further, an embodiment of the present disclosure is directed to the image analysis system, wherein the image analysis server determines a presence or absence of the monitored object in the monitoring area based on confidences of the plurality of grids, and detects an abnormality when a confidence value in any of the grids is inconsistent with information on the presence or absence. Accordingly, it is possible to detect an abnormality of the monitored object from image data without requiring information from an external device, and the system can be realized with a simple configuration.

Further, an embodiment of the present disclosure is directed to the image analysis system, wherein the image analysis server obtains information indicating a presence or absence of the monitored object in the monitoring area from the outside, and detects an abnormality when a confidence value in any of the grids is inconsistent with the information indicating the presence or absence. Accordingly, the abnormality of the monitored object can be detected by simple processing using information from the outside.

Further, an embodiment of the present disclosure is directed to the image analysis system, wherein the image analysis server accumulates a set of a grid unit image and information on the presence/absence of the monitored object corresponding to the grid unit image as training data, performs training using the training data to build a new model, and updates the trained model with the new model. Accordingly, the training accuracy and the detection accuracy can be improved.

Further, an embodiment of the present disclosure is directed to the image analysis system, wherein the image analysis server excludes an image in which an abnormality is detected and information on the presence or absence of the monitored object corresponding to the image in which the abnormality is detected from the training data. Accordingly, the training accuracy and the detection accuracy can be further improved.

Further, an embodiment of the present disclosure is directed to an image analysis method for detecting a state of a specific monitored object by analyzing an input image of a monitoring area, the image analysis method including dividing, in the image of the monitoring area, a portion of an area in which the monitored object is expected to be present into a plurality of grids, creating a trained model obtained by training, for each of the grids, an image in which the monitored object is present and an image in which the monitored object is not present, and determining whether the monitored object is present within the grids based on the trained model for the input image. Accordingly, determination can be made by analyzing only a specific area set in advance instead of the entire image, and the amount of processing can be significantly reduced. In addition, an administrator of the monitored object is able to quickly recognize and respond to an abnormality based on the determination result.

Further, an embodiment of the present disclosure is directed to an image analysis program which operates on an image analysis server which analyzes an input image of a monitoring area and detects a state of a specific monitored object, wherein the image analysis program causes the image analysis server to perform generating, for each grid, a trained model trained by associating "1" with an image in which the monitored object is present and "0" with an image in which the monitored object is not present in the grid, calculating, for the input image, a confidence of a presence of the monitored object for each grid using the trained model, obtaining information indicating a presence or absence of the monitored object in the monitoring area from an outside so that the image for each grid and the obtained presence or absence information are memorized in association therewith, and detecting an abnormality when a confidence value in at least one of the grids is inconsistent with the information of the presence or absence. Accordingly, the abnormality of the monitored object can be detected accurately by simple processing using information from the outside.

BRIEF DESCRIPTION OF THE DRAWINGS

FIG. 1 is a configuration diagram of the image analysis system.

FIG. 3 is an explanatory diagram illustrating an example of abnormality detection in an image analysis server 1.

FIG. 4 is a flowchart illustrating a process at the time of operation of the image analysis server 1.

FIG. 5 is an explanatory diagram illustrating an example of image data.

FIG. 6 is an explanatory diagram illustrating an example of training data.

FIG. 7 is a flowchart of a retraining process of the image analysis server 1.

DETAILED DESCRIPTION

Figure 2A:
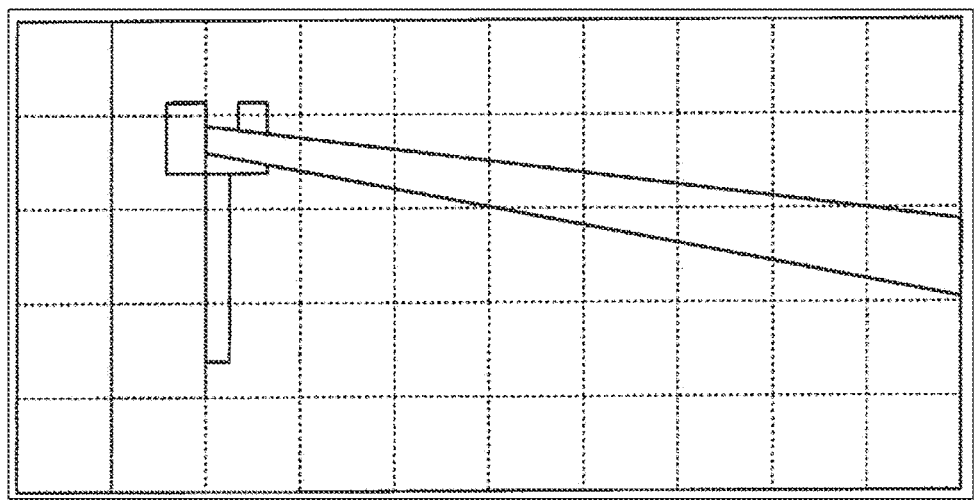
FIGS. 2A and 2B are explanatory diagrams illustrating an outline of the image analysis method.

An embodiment of the present disclosure will be described with reference to the drawings.

Summary of Embodiment

An image analysis system according to the embodiment of the present disclosure may monitor the state of an object (a monitored object) present in a monitoring area, and include an image analysis server which divides an image of the area into a plurality of grids, creates a trained model obtained by training, for each grid, an image in which the monitored object is present and is not present for a partial grid in which the monitored object is expected to be present, and determines whether the monitored object is present within the grids based on the trained model for an input image. The state of the monitored object can be detected by simple processing in units of the grid, and an administrator can determine whether the state of the monitored object is normal, which can improve convenience.

Further, the image analysis server (the present image analysis server) of the image analysis system is loaded with a model trained by associating "1 (present)" with an image in which the monitored object is present in each grid and "0 (is not present)" with an image in which the monitored object is not present. When an image is input to the model, the confidence that an object is present is calculated in grid units. Based on the confidences of the plurality of grids in the monitoring area, it is determined whether the monitored object is present in the area and whether the object is in a normal state, and it is possible to improve convenience.

Further, the present image analysis server of the image analysis system may determine a presence or absence of the monitored object in the monitoring area based on the confidences of the plurality of grids, detect an abnormality when a confidence value in any of the grids is inconsistent with presence or absence information, detect an abnormality of the monitored object from the image data without requiring information from an external device, and realize a system with a simple configuration. Further, the image analysis server of the image analysis system may receive data indicating the state of the monitored object from the outside, and detect the abnormality when the received state of the monitored object and the presence/absence of the monitored object for each grid determined from an image do not match. In addition, an administrator is able to quickly recognize and respond to a defect of the monitored object.

Further, the image analysis server of the image analysis system may accumulate set of a grid unit image and information on a presence/absence of the monitored object corresponding to the grid unit image as training data, perform training using the training data to build a new model, and update a trained model with the new model. Accordingly, the training accuracy and the detection accuracy can be further improved.

Further, the image analysis server of the image analysis system may exclude an image in which an abnormality is detected and information on the presence or absence of the monitored object corresponding to the image in which the abnormality is detected from the training data. Accordingly, the training accuracy and the detection accuracy can be further improved. In addition, the image analysis method (the present image analysis method) according to the present embodiment is an image analysis method in the image analysis server of the image analysis system, and the image analysis program (the present image analysis program) according to the present embodiment is a program that causes the present image analysis server to perform the image analysis processing.

Configuration of the Image Analysis System: FIG. 1

The configuration of the image analysis system will be described with reference to FIG. 1. FIG. 1 is a configuration diagram of the image analysis system.

In addition, in the present embodiment, a system for monitoring a gate of a parking lot will be described as an example as a monitoring target.

As illustrated in FIG. 1, the image analysis system includes an image analysis server 1, an image database (image DB) 2, and a training data storage 3, and further includes a display terminal 4, a camera 5, and a gate opening/closing device 6 as a configuration connected to the image analysis server 1 via a network 7.

The image analysis server 1 is a characteristic part of the system, and is a server which analyzes an image of a monitored object and detects its state or abnormality. Herein, the monitored object is a gate bar provided at the gate of the parking lot.

The image analysis server 1 includes a controller 11, a storage 12, and an interface 13, and the controller 11 executes a processing program stored in the storage 12, thereby collecting and analyzing image data, and realizing the function of training described later.

As a feature of the image analysis server 1, for an image of a monitored object, the entire image captured by a camera is not targeted for analysis, but a screen is divided into a plurality of rectangular areas (grids) and image analysis is performed only on the grid where there is a high possibility that the monitored object is present in the monitoring area.

As a result, the processing becomes simpler than the case where the entire screen is targeted for processing, and the amount of processing can be significantly reduced.

In other words, the image analysis system is not in an environment in which it is not possible to predict when a monitored object will appear and how it will move, but the area in which the monitored object is steadily present is almost constant, and the movement of the monitored object becomes particularly effective when the operation is predetermined.

The controller 11 of the image analysis server 1 is loaded with a trained model realized by artificial intelligence (AI).

Specifically, the trained model of the controller 11 is a model in which training is performed by reading teaching data in which each image is tagged with an "open state" ("0") or a "closed state" ("1") with respect to a large number of images corresponding to the closed (down) state and the open (up) state of the bar (gate bar) that opens and closes the gate of the parking lot.

In addition, the present image analysis server 1 continuously trains the image data and the open/closed state of the gate bar even during operation, and updates (retrains) the trained model as often as possible to improve the accuracy of image analysis.

The processing of the image analysis server 1 will be described later.

Further, it is also possible to prepare an image as a reference for an open state and a closed state and perform image analysis by processing such as pattern matching without loading a model realized by AI on the controller 11.

Also, in this case, since only the target grid needs to be processed, the processing can be significantly reduced as compared with the conventional case.

An image DB 2 accumulates images of a monitoring area captured by the camera 5 and received via a network 7 together with photographing date and time.

The training data storage 3 stores training data (teaching data) for further training an analysis model of the image analysis server 1. The training data will be described later, but it is an image that associates the image data obtained during the operation of the system with the open/closed state of the gate bar. The training data in grid units is a feature of the present system.

The display terminal 4 is a personal computer or the like that may be operated and viewed by a manger, receives an abnormality notification signal from the image analysis server 1, and displays an alarm.

The camera 5 is fixedly installed at a predetermined position where an open state and a closed state of the gate bar, which is the monitored object, can be photographed, and an image of the gate bar is photographed and transmitted to the image analysis server 1 via the network 7. Further, the camera 5 is operated in a state where a pan, tilt, and zoom are fixed.

The gate opening/closing device 6 is a device that controls raising/lowering (opening/closing) of the gate bar, and includes an opening/closing mechanism that holds the gate bar and performs an opening/closing operation. "Opening and closing the gate bar" may be referred to as "opening and closing the gate".

Further, the gate opening/closing device 6 notifies the image analysis server 1 of data (gate opening/closing information) indicating the current open/closed state of the gate.

The image analysis server 1 retrains the model by associating the image data from the camera 5 with the open/closed state of the gate obtained from the gate opening/closing device 6, or detects an abnormality (for example, malfunction, breakage, cracking, cutting) of the monitored object (the gate bar).

Figure 2B:
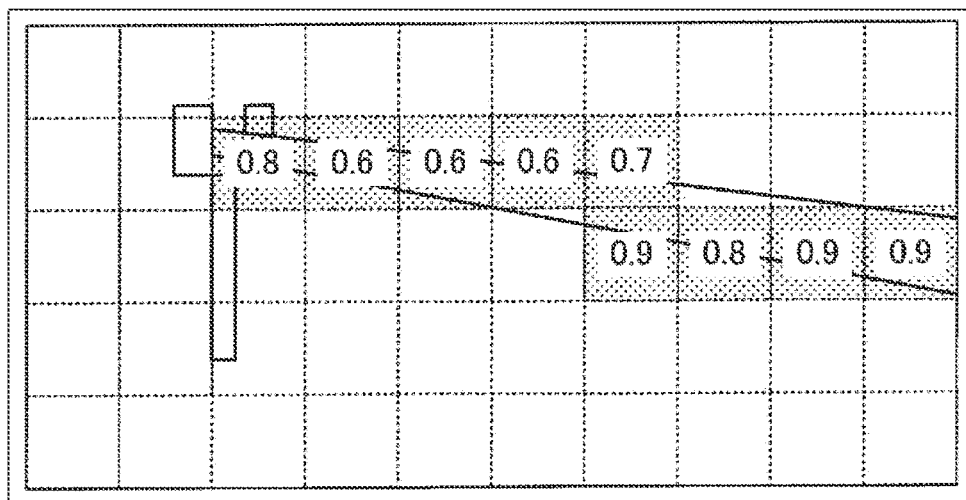

Outline of the Image Analysis Method: FIGS. 2A and 2B

Next, an outline of an image analysis method in the image analysis system will be described with reference to FIGS. 2A and 2B. FIGS. 2A and 2B are explanatory diagrams illustrating an outline of the image analysis method.

In the image shown in FIG. 2A, as for the gate bar, the front right side of a screen is a portion attached to the gate opening/closing device 6, and the back left side of the screen is a tip part. A holder for holding the gate bar is provided at the tip part.

The gate bar is driven by the gate opening/closing device 6. For example, and the gate is opened/closed by moving the tip part up and down so as to draw an arc around a portion attached to the gate opening/closing device 6.

In the system, since the position, pan, tilt, and zoom of the camera 5 are fixed, the area in which the gate bar normally exists when the gate bar is closed is almost constant.

Accordingly, the image analysis server 1 divides an image into a plurality of grids, extracts an area in which the gate bar normally exists, and per image analysis only on the grid. In other words, for any image, the image of the grid at the same position on the screen is analyzed. In the example of FIGS. 2A and 2B, nine grids are extracted and each has a grid number (not shown).

Specifically, the image analysis server 1 reads an image in which the gate is in an open state and an image in which the gate is in a closed state for each preset grid number, and builds a trained model by tagging the image in the open state with "0" and the image in the closed state with "1".

In addition, the holder holding the tip of the gate, a neighboring building (not shown), etc. are trained as a background image so as not to affect the image analysis of a gate bar.

Then, when the image from the camera 5 is input, the image analysis server 1 calculates the confidence (value of 0 or more and 1 or less) that the gate bar is present in the grid for each grid number. FIG. 2B illustrates an example of the confidence for each grid.

Then, based on the obtained confidence, the image analysis server 1 determines that the gate bar is not present in the grid when the confidence that the gate bar is present in the grid is low, for example, even though the open/closed state of the gate is "closed," and outputs an abnormality notification signal.

Further, in the example of FIGS. 2A and 2B, the model is trained using the image of the gate bar viewed diagonally from the side (thick in the front and thin in the back) to calculate the confidence, but the image may be converted into a state in which the gate bar is viewed from the front (thickness is constant), and then training and calculation of confidence may be performed.

In addition, the size and position of the grid may be set arbitrarily.

Example of Abnormality Detection: FIG. 3

Next, abnormality detection in the present image analysis server 1 will be described with reference to FIG. 3. FIG. 3 is an explanatory diagram illustrating an example of abnormality detection in the image analysis server 1.

As illustrated in FIG. 3, when the gate bar is bent in the middle, the confidence in the grid at the tip part is low.

Using the same, the image analysis server 1 determines that the gate bar is present in the grid when the confidence obtained from the input image is equal to or greater than a preset threshold value, and that the gate bar is not present when the confidence is equal to or less than the threshold value.

For example, when the threshold value of confidence is set to 0.4, in the example of FIG. 3, the confidence of the grid at the most tip part is 0.2 and the confidence of the grid to the right is 0.4. It is determined that there is no gate bar present in these grids.

When the gate opening/closing information from the gate opening/closing device 6 is "closed" and the gate bar is not present in any of the grids (when the confidence is equal to or less than the threshold value), the gate opening/closing information and the state of existence based on the confidence do not match, and the image analysis server 1 detects an abnormality and outputs an abnormality notification signal. When the confidence of the tip part is low, it is expected that the gate bar is damaged (bending, cracked, cut, etc.) in some way.

In addition, even when the gate open/close information is "open," an abnormality is detected when there is a grid in which the gate bar is present (the confidence is equal to or greater than the threshold value). In this case, although the gate bar is raised, abnormalities such as a state in which the bar is bent and hangs down in the middle, a malfunction of the opening/closing mechanism, and an erroneous detection due to a change in the background image are expected.

Further, when the gate opening/closing information is "closed" and it is determined that the gate bar is present in all the grids of the monitored object (the confidence is equal to or greater than the threshold value), or when the opening closing information is "open" and it is determined that the gate bar is not present in all the grids, the image analysis server 1 detects that the state of the gate bar is normal.

In the present system, the state and abnormality of the gate bar are detected in this way.

Compared to conventional pattern matching, the method of the present system is not easily affected by changes an sunshine and time, and may accurately detect the state of the monitored object.

Processing of the Image Analysis Server: FIG. 4

Next, the processing of the image analysis server 1 will be described with reference to FIG. 4. FIG. 4 is a flowchart illustrating a process at the time of operation or the image analysis server 1.

As illustrated in FIG. 4, when an image from the camera 5 is input to the image analysis server 1 (S11) and the gate open/closed state from the gate opening/closing device 6 is input to the image analysis server 1 (S12), the received image is associated with the gate open/closed state and saved in the image DB 2 (S13).

Then, the image analysis server 1 cuts out (extracts) a preset grid from the input image, and calculates the confidence for each cut out grid (S14).

Further, as described above, the image analysis server 1 compares the confidence of each grid with the threshold value, collates the same with the gate opening/closing information from the gate opening/closing device 6, and detects the presence/absence of an abnormality (S15).

Then, the image analysis server 1 determines whether an abnormality has been detected (S16), and when an abnormality is detected (in the case of Yes), outputs an abnormality notification signal the display terminal 4 (S17). As described above, the case where an abnormality is detected is a case where the gate openly/closing information and the existence of the gate bar in the grid obtained from the confidence do not coincide (mismatch or inconsistent).

In addition, when no abnormality is detected in the process S16 (in the case of No), the image analysis server 1 saves the images input in the processes S11 and S12 and the corresponding open/closed state in the training data DB as training data (S18).

In other words, the image and the open/closed state when an abnormality is detected in the process S16 are not used as training data, and the training accuracy is not lowered.

This process is one of the features of the image analysis server 1 of the present system, and the image in a normal state and an open/closed state are accumulated as teaching data for training a model. For example, retraining is performed periodically to build a new model and update the model used for operation.

Thereby, the analysis accuracy in the image analysis server 1 can be improved. For example, changes in the background image can be reflected as appropriate, and as a result, changes in the on-site landscape can be responded in real time, so that more accurate image analysis can be performed.

When the gate of the parking lot is monitored, it is normally closed, and it is open only when a vehicle passes through. Accordingly, all images in an open state are saved, but images in a closed state may be saved less frequently.

For example, in the process S18, when the image to be saved is the one in an open state, it is saved in the training data DB as it is, and when the image is the one in a closed state, a method such as saving after a certain period of time (for example, 30 minutes) has elapsed from the previous save may be considered.

Then, when the process S18 is completed, the image analysis server 1 returns to the process S11 and repeats the same process for the next image.

In this way, the processing during the operation of the image analysis server 1 is performed.

Example of Image Data: FIG. 5

Next, an example of image data stored in the image DB 2 will be described with reference to FIG. 5. FIG. 5 is an explanatory diagram illustrating an example of image data.

As illustrated in FIG. 5, the image data stores an image file, an open/closed state, and a photographing time (year/month/day-hour/minute/second) for each ID. In the drawings, the photographing times are described as the same, but they are different. The obtained image is stored in the image DE 2 regardless of whether it is normal or abnormal.

An image whose open/closed state is "open" may be saved separately so as to be used as a background image.

Example of Training Data: FIG. 6

Next, the training data stored in the training data storage 3 will be described with reference to FIG. 6. FIG. 6 is an explanatory diagram illustrating an example of training data.

The training data is teaching data for retraining a model, and is generated by using an image obtained during operation and an open/closed state.

As illustrated in FIG. 6, the training data is stored data in which a grid image is associated with an open/closed state at that time for each grid number. The open/closed state is information obtained from the gate opening/closing device 6.

In other words, in the process S18 illustrated in FIG. 4, the image analysis device 1 associates a normal image for each grid extracted in the process S14 with an open/closed state and saves the same as training data.

Then, the made analysis server 1 performs training using the training data to build a new model. When the new model is generated, an old model is updated (replaced, switched) with the new model, and is used for image analysis processing.

As a result, in the present system, training data for retraining may be accumulated during the operation of the image analysis server 1, and it is possible to easily retrain and frequently update the trained model to improve the analysis accuracy without preparing teaching data separately.

Outline of Retraining Process: FIG. 7

Next, the retraining process in the image analysis server 1 will be described with reference to FIG. 7. FIG. 7 is a flowchart of a retraining process of the image analysis server 1.

The image analysis server 1, for example, periodically performs retraining processing.

As illustrated in FIG. 7, the image analysis server 1 reads training data from the training data storage 3 (S21), performs training using the training data as teaching data, and re-builds (re-trains) a model (S22).

Then, the image analysis server 1 switches the trained model to the newly generated model (S23), and ends the process. As a result, thereafter, the operation is performed with the updated trained model.

The re-training process is performed in this way.

Effect of the Present Embodiment

According to the system, the image analysis server 1 divides a portion of an area in an image in which a gate bar as a monitored object is expected to be present into a plurality of grids, and is loaded with a model trained by associating "1" with an image in which the gate bar is present and "0" with an image in which the gate bar is not present in each grid. When an image is input to the model, the confidence that the gate bar is present for each grid is calculated. When the confidence is equal to or greater than a threshold value, it is determined that the gate bar is present in the grid, and when the confidence is less than the threshold value, it is determined that the gate bar is not present. In addition, the gate opening/closing information indicating an open/closed state of the gate bar is obtained from the gate opening/closing device 6, and an abnormality notification signal is output to the display terminal 4 when the presence/absence of the gate bar obtained from the confidence and the gate opening/closing information do not coincide. Accordingly, instead of processing the entire screen, by extracting only a part as grids and performing image analysis, the amount of processing can be significantly reduced, and abnormalities can be quickly detected and notified. In addition, it is not easily affected by changes in sunshine and time, and it is possible to accurately detect the state of the object.

In particular, it is more effective when monitoring a specific monitored object that makes a fixed movement.

Further, according to the present system, when the image analysis server 1 determines that the state of the gate bar is normal, the image analysis server 1 extracts an image in grid units based on the image from the camera 5 and the gate opening/closing information from the gate opening/closing device 6, associates the gate opening/closing information and stores the same as training data in the training data storage 3, uses the training data, for example, to periodically retrain to generate a new model, and updates the trained model. Accordingly, the training data can be generated from images obtained during operation, the model can be updated frequently by efficiently performing retraining, and the image analysis accuracy can be improved.

Further, herein, the case of monitoring the gate of the parking lot has been described as an example, but is not limited thereto. It is possible to realize a system with the same configuration as long as it captures a monitored object in which same operations are repeated with a fixed-point camera and detects a state or abnormality.

For example, it is also used for monitoring the entry of trains, monitoring an open/closed state of home doors, monitoring the operation of robot arms that perform fixed movements, and monitoring blocking rods of railroad crossings. Also, when a camera is installed above the train door, it is possible to monitor whether a foreign object is caught in the door.

Further, in the above-described embodiment, an example in which determining is performed by a trained model using only nine grids as the plurality of grids has been described. However, an embodiment of the present disclosure is not limited thereto, and a method of making a determination using a trained model using grids of two or three rows in which the gate bar is illustrated in FIGS. 2A and 2B may be used.

In this case, since the grids other than the grids in which the gate bar is present are always the background, it is efficient to train all the background parts as "0".

In other words, instead of creating a training model that determines "0" and "1" for each grid, a plurality of grids for several rows are input as one image, a map with the background part set to "0" and the gate bar part set to "1" is trained as the teaching data to generate the trained model, and the output at the time of inference also outputs a map of confidence. This method is so-called grid segmentation.

Then, the abnormality detection in this method and the presence/absence of the gate bar may be determined by comparing a confidence map for determination prepared in advance and a map output by the trained model, that is, by comparing a distribution of confidences to determine a similarity.

The determination of similarity may be made by, for example, a method using SAD (Sum of Absolute Difference), which is an index for observing the correlation of images, a method using SSD (Sum of Squared Difference), or a method using NCC (Normalized Cross-Correlation).

In addition, instead of observing the similarity of the distribution, abnormality detection and the presence/absence of the gate bar may be determined by comparing a confidence in each grid of one map with a confidence in each grid of another map for every grid in the same manner as in the above-described embodiment.

Further, the training data for retraining may be easily generated based on the control information indicating the gate opening/closing obtained from the outside as in the above-described embodiment, and may be created as a map in which "1" is assigned to the grid in which the gate is known to be present in advance among the grids for several rows, and "0" is assigned to a background part to be recorded in the training data storage 3. Even through the grids for several rows are managed in a table as illustrated in FIG. 6, since the grid number corresponds to the X-Y coordinates, the image map at the corresponding time may be reconstructed and used for grid segmentation.

In the above-described embodiment, as the information indicating the presence or absence of the gate obtained from the outside, the control information indicating the gate opening/closing obtained from the gate opening/closing device 6 has been described as an example. However, an embodiment of the present disclosure is not limited thereto, and may be obtained based on the sound output when the gate is opened and closed or the lighting state of a lighting device such as a traffic light.

In the case of sound, a microphone and a voice analysis device are provided in the vicinity of the camera 5 to obtain information indicating the presence or absence of the gate. When it is based on the lighting state of the lighting device, a control signal of the lighting device or the analysis result of the lighting state based on the image captured by the camera are used as the information indicating the presence or absence of the gate.

Another Example of the Image Server

Next, an image analysis server (another image analysis serve)) according another embodiment of the present disclosure will be described. The configuration of another image analysis server is the same as the configuration of the image analysis server 1 illustrated in FIG. 1.

Another image analysis server is also used in the image analysis system illustrated in FIG. 1, but the gate opening/closing information is not obtained from the gate opening/closing device 6, and the opening/closing of the gate is determined only from the image information.

Specifically, another image analysis server calculates, for the plurality of grids to be monitored, the confidence for each grid, and then, the presence/absence (open/closed state) of the gate bar is determined based on the distribution of the confidences throughout the plurality of grids.

For example, another image analysis server finds the average value of confidences throughout the plurality of grids. When the average value is equal to or greater than a first threshold (for example, 0.6), it is determined that the gate bar is in a closed state. When the average value is equal to or less than a second threshold value (for example, 0.4), it is determined that the gate bar is in an open state.

Further, another image analysis server is not limited to a method of reading an image in which the gate is in an open state and an image in which the gate is in a closed state for each preset grid number, and building a trained model by tagging the image in the open state with "0" and the image in the closed state with "1," but a method of expressing the same as a decimal value using the ratio of the number of pixels of the gate bar in each grid may be used.

When the average value of confidence is between the first threshold value and the second threshold value, another image analysis server may send an image to the display terminal 4 as a pending state without determining the open/closed state of the gate, and an administrator may determine the presence or absence of the gate bar by observing the image displayed on the display terminal 4.

Then, the image file, the determined gate open/closed state (1 or 0), and the photographing time are stored in the image DB 2 in association with each other.

Then, another image analysis server detects an abnormality when the confidence in each grid is low even though the gate is determined to be closed.

For example, when it is determined that the gate bar is present from the average of confidences of the entire grid cut out, but the confidence of the grid at the tip part is very low (for example, less than 0.3), it is determined to be abnormal and an abnormality notification signal is output. In this case, it is assumed that the gate bar is bent at the tip part.

Further, similar to the present image analysis server, another image analysis server associates the image of each grid in the normal state obtained during operation with the determined gate open/closed state, accumulates the same in the training data storage 3, and uses the same for model retraining.

Further, another image analysis server may determine the gate open/closed state from confidences of the entire grid of an image, obtain gate open/close information from the gate opening/closing device 6, and collate the two to detect an abnormality.

For example, when the information from the gate opening/closing device 6 is a closed state but the determination based on the entire grids from the image indicates an open state, a malfunction of the opening/closing mechanism or the like is expected.

Effect of Another Image Analysis Server

According to another image analysis server, the confidence is calculated for each grid for the plurality of grids to be monitored, and the presence or absence of the gate bar is determined based on the distribution of the confidences throughout the plurality of grids. Since the abnormality is detected from the matching between the determination result and the confidence in each grid, even though the information indicating the gate open/closed state may not be obtained from the gate opening/closing device, abnormalities can be detected only by another image analysis server. Accordingly, it is possible to build a system with a simple configuration.

INDUSTRIAL APPLICABILITY

An embodiment of the present disclosure is suitable for an image analysis system, an image analysis method, and an image analysis program that make it possible to monitor a state of a specific object and quickly detect and report an abnormality without increasing the amount of processing.

DESCRIPTION OF REFERENCE NUMERALS

1: Image analysis server, 2: Image database, 3: Training data storage, 4: Display terminal, 5: Camera, 6: Gate opening/closing device, 7: Network, 11: Controller, 12: Storage, 13: Interface

The invention claimed is:

1. An image analysis system having an image analysis server which analyzes an input image of a monitoring area and detects a state of a specific monitored object,
wherein the image analysis server is configured to
divide, in the input image of the monitoring area, a portion of an area in which the monitored object is expected to be present into a plurality of grids,
generate a trained model trained by associating "1" with an image of a grid in which the monitored object is present and "0" with an image of a grid in which the monitored object is not present for each grid, calculate, for the input image, a confidence of a presence of the monitored object for each grid using the trained model, determine a presence or absence of the monitored object in the monitoring area based on a comparison result between confidences of the plurality of grids and a threshold value, and detect an abnormality when a confidence value in at least one of the grids is inconsistent with the determination result.

2. The image analysis system of claim 1, wherein the image analysis server is configured to obtain information indicating the presence or absence of the monitored object in the monitoring area from an outside, and detect the abnormality when the confidence value in at least one of the grids is inconsistent with the information indicating the presence or absence of the monitored object.

3. The image analysis system of claim 2, wherein the image analysis server is configured to accumulate a set of a grid unit image and information on the presence or absence of the monitored object corresponding to the grid unit image as training data, perform training using the training data to build a new model, and update the trained model with the new model.

4. The image analysis system of claim 3, wherein the image analysis server is configured to exclude an image in which an abnormality is detected and information on the presence or absence of the monitored object corresponding to the image in which the abnormality is detected from the training data.

5. The image analysis system of claim 1, wherein the image analysis server is configured to obtain information indicating the presence or absence of the monitored object in the monitoring area from an outside, and detect an abnormality when the information indicating the presence or absence of the monitored object obtained from the outside is different from the determination result.

6. The image analysis system of claim 5, wherein the image analysis server is configured to accumulate a set of a grid unit image and information on the presence or absence of the monitored object corresponding to the grid unit image as training data, perform training using the training data to build a new model, and update the trained model with the new model.

7. The image analysis system of claim 6, wherein the image analysis server is configured to exclude an image in which an abnormality is detected and information on the presence or absence of the monitored object corresponding to the image in which the abnormality is detected from the training data.

8. The image analysis system of claim 1, wherein the image analysis server is configured to accumulate a set of a grid unit image and information on the presence or absence of the monitored object corresponding to the grid unit image as training data, perform training using the training data to build a new model, and update the trained model with the new model.

9. The image analysis system of claim 8, wherein the image analysis server is configured to exclude an image in which an abnormality is detected and information on the presence or absence of the monitored object corresponding to the image in which the abnormality is detected from the training data.

10. An image analysis method for detecting a state of a specific monitored object by analyzing an input image of a monitoring area, comprising:

dividing, in the input image of the monitoring area, a portion of an area in which the monitored object is expected to be present into a plurality of grids, generating a trained model trained by associating "1" with an image of a grid in which the monitored object is present and "0" with an image of a grid in which the monitored object is not present for each grid, calculating, for the input image, a confidence of a presence of the monitored object for each grid using the trained model, determining a presence or absence of the monitored object in the monitoring area based on a comparison result between confidences of the plurality of grids and a threshold value, and detecting an abnormality when a confidence value in at least one of the grids is inconsistent with the determination result.

11. An image analysis program which operates on an image analysis server which is configured to analyze an input image of a monitoring area and detect a state of a specific monitored object, wherein the image analysis program causes the image analysis server to perform dividing, in the input image of the monitoring area, a portion of an area in which the monitored object is expected to be present into a plurality of grids, generating a trained model trained by associating "1" with an image of a grid in which the monitored object is present and "0" with an image of a grid in which the monitored object is not present for each grid, calculating, for the input image, a confidence of a presence of the monitored object for each grid using the trained model, obtaining information indicating a presence or absence of the monitored object in the monitoring area from an outside, and detecting an abnormality when a confidence value in at least one of the grids is inconsistent with the information indicating the presence or absence of the monitored object, wherein the presence or absence of the monitored object in the monitoring area is determined based on a comparison result between confidences of the plurality of grids and a threshold value.

* * * * *